United States Patent [19]

Schmidt et al.

[11] Patent Number: 4,529,787
[45] Date of Patent: Jul. 16, 1985

[54] BULK POLYMERIZATION PROCESS FOR PREPARING HIGH SOLIDS AND UNIFORM COPOLYMERS

[75] Inventors: Ronald E. Schmidt; Harold H. Schultz; Dennis M. Wilson, all of Racine, Wis.

[73] Assignee: S. C. Johnson & Son, Inc., Racine, Wis.

[21] Appl. No.: 388,764

[22] Filed: Jun. 15, 1982

[51] Int. Cl.³ ............................................. C08F 2/02
[52] U.S. Cl. ................................... 526/317; 526/320; 526/329.2
[58] Field of Search ..................... 526/317, 320, 329.2

[56] References Cited

U.S. PATENT DOCUMENTS

| | | | |
|---|---|---|---|
| 2,496,653 | 2/1950 | Allen et al. | 260/93.5 |
| 3,028,367 | 4/1962 | O'Brien | 260/77.5 |
| 3,053,033 | 5/1962 | Schweitzer et al. | 526/317 |
| 3,080,348 | 3/1963 | Lang et al. | 260/86.7 |
| 3,466,269 | 9/1969 | Fivel | 526/329.2 |
| 3,673,168 | 6/1972 | Burke et al. | 526/209 |
| 3,859,268 | 1/1975 | Novack et al. | 260/88.2 |
| 3,968,059 | 7/1976 | Shimada et al. | 526/68 |
| 3,979,352 | 9/1976 | Brady et al. | 260/33.4 R |
| 4,013,607 | 3/1977 | Dwyer et al. | 260/29.6 H |
| 4,022,730 | 5/1977 | Lewis et al. | 260/28.5 R |
| 4,023,977 | 4/1977 | Mercurio et al. | 106/778 |
| 4,075,242 | 2/1978 | Rhum | 670/190 |
| 4,117,235 | 9/1978 | Taylor | 560/205 |
| 4,137,389 | 1/1979 | Wingler | 526/190 |
| 4,141,806 | 2/1979 | Keggenhoff | 526/317 |
| 4,178,320 | 12/1979 | Chattha | 525/188 |
| 4,237,257 | 12/1981 | Moriya et al. | 526/230.5 |
| 4,245,074 | 1/1981 | Buter et al. | 526/214 |
| 4,276,212 | 6/1981 | Khanna | 260/39 R |
| 4,276,432 | 6/1981 | Rhum | 560/190 |
| 4,293,661 | 10/1981 | Probst et al. | 525/127 |
| 4,328,327 | 5/1982 | Tanaka et al. | 526/66 |

FOREIGN PATENT DOCUMENTS 859517 1/1961 United Kingdom .
1107249 3/1968 United Kingdom .

OTHER PUBLICATIONS

Husain et al., AICHE Symposium Series, vol. 72, pp. 112-127 (1976).
Takahasi, "Recent Advances in High Solids Coatings", Polym. Plast. Technol. Eng., vol. 15 (1) pp. 1, 10 (1980).
Hill, et al., "Design Considerations for High Solids Coatings", Progress in Organic Coatings, vol. 10 (1982) pp. 55-88.
Bengough, et al., European Polymer Journal, vol. 14, pp. 889-894 (1978).

Primary Examiner—Paul R. Michl

[57] ABSTRACT

A process to continuously bulk polymerize vinylic monomers to prepare low molecular weight, uniform, polymers employs minor amounts of initiator and, optionally solvents, at short residence times and moderate reaction temperatures to provide high yields of a product suitable for high solids applications.

18 Claims, No Drawings

BULK POLYMERIZATION PROCESS FOR PREPARING HIGH SOLIDS AND UNIFORM COPOLYMERS

CROSS-REFERENCE TO RELATED APPLICATION

This application is related copending commonly assigned application Ser. No. 337,343, filed Jan. 7, 1982, now U.S. Pat. No. 4,414,370.

BACKGROUND OF THE INVENTION

This invention relates to a process for making copolymers of uniform molecular weight. In particular, it relates to the preparation of a high solids, low molecular weight, copolymer having a narrow weight distribution.

Conventional solvent based industrial finishes and coatings have presented many problems to date. Solvents can pollute the workplace and environment; they are readily ignited, they are toxic, they are expensive, they lower the quality of the finish and they can color an otherwise clear finish. As a replacement for these solvent-based finishes, the trend in the polymer industry has been toward high solids, liquid coatings. Such coatings typically have a solids content of at least about 70% (non-volatiles).

High solids coatings offer significant advantages over conventional, solvent-thinned coatings. They do not pollute the air; they reduce or eliminate exudation of fumes in use; they reduce energy requirements for their preparation in terms of material, energy expended and labor and, unlike solvent-based systems, they do not present significant fire and toxicity problems. High solids coatings also provide substantial advantages over other high solids liquids, such as solventless, water-borne, powder and non-aqueous dispersion systems and they also offer a better balance of properties.

Perhaps the most difficult problem in preparing and utilizing high solids coatings is selection and control of viscosity. It is recognized that to control viscosity in the preferable range from about 0.1 to 5 poises, it is desirable to employ low molecular weight resins or oligomers, alone or in combination with a reaction solvent. Higher molecular weight resins are usually too viscous to be employed for high solids applications. Conventionally prepared low molecular weight resins (Mn-500 to 6000, especially 1000 to 3000) are subject to several significant defects.

To obtain resins of low viscosity and good overall application performance, it has been found necessary to make resins having very narrow molecular weight distributions, Takahashi, *Recent Advances In High Solids Coatings*, Polm. Plast. Technol. Eng. 15(1), pp. 1, 10 (1980). It has been postulated that the presence of high molecular weight polymer fractions dominates the viscosity characteristics of a high solids, low molecular weight resin. The relative presence or absence of high molecular weight fractions is indicated by the polydispersity ratio and the distribution index.

The polydispersity ratio (Mw/Mn, W/N or ratio of weight average molecular weight to number average molecular weight) is of vital importance to scientists in this field. Products having the same average molecular weight, but having a different molecular polydispersity possess different solution viscosities. The product with the higher polydispersity always has a higher solution viscosity, because high molecular weight fractions make a significantly greater contribution toward viscosity than low molecular weight fractions.

There is a another molecular weight measure known as the sedimentation average molecular weight, Mz. In relative terms, the $Mn < Mw < Mz$. If only one molecular species is present then $Mn = Mw = Mz$. However, this theoretical representation is not the case with polymers made by free radical processes.

Mz is a rather specific measure of the number of molecules in the higher weight fractions of the molecular weight range. The distribution index or ratio of (Mz/Mn or Z/N) is a key measure of the range of molecular weight distribution for a given resin, and provides an indication of the presence or absence of higher weight fractions. Products with a higher distribution index will exhibit higher solution viscosities and less desirable application properties. Contemporary industry standards require that a process to prepare resins suitable for high solids systems have sufficient flexibility to selectively increase or decrease the molecular weight of the desired product and its polydispersity and distribution ratios in accordance with market requirements.

In addition, products containing undue quantities of very low molecular weight fractions (dimers, trimers, etc.) can exhibit number average molecular weights (Mn) skewed to be nonreflective of the properties of the product and can introduce substandard properties to the product. Very low molecular weight fractions, such as dimers, trimers, and other oligomers, can be quite nonuniform or heterogeneous, when compared to the desired product, especially if a terpolymer or tetrapolymer is prepared.

Applications for high solids coating include coatings and finishes for cans, coils, fabrics, vinyls, papers, autos, furniture, magnet wire, appliances, metal parts, wood panels and floors. Other typical applications for such coatings are as paints, inks, adhesives, tackifiers and dispersants. Such applications can require that copolymers be formed from hard monomers, soft monomers, acid monomers and/or monomers with other crosslinkable functionalities.

Attempts have been made to prepare high solids, low molecular weight acrylic (co)polymers in the 500 to 6,000 Mn range, due to the valuable advantages acrylics afford. Their relatively low cost, clear color, good outdoor durability, varying chemical resistances and good thermal stability are just some of the benefits attributed to acrylics. No process has been entirely successful in preparing high yields of a broad spectrum of high solids, low molecular weight acrylic polymer products having a narrow molecular weight distribution and good color which is of sufficient low viscosity for practical use.

An anionic process for making certain specific relatively narrow molecular weight acrylic oligomers with a Mn of 600 to 5,000 has been proposed as illustrated in U.S. Pat. No. 4,064,161. The polydispersity is said to be from 1.1 to 3. This anionic process presents distinct disadvantages, among them are: substantial residual levels of initiator fragments, the inability to copolymerize styrenic type monomers with the acrylic monomers (as noted in U.S. Pat. No. 4,137,389) and the inability to copolymerize oxyalkyl esters of acrylic or methacrylic acid. Further, a hydrolysis or transesterification step is required to obtain hydroxyl functional group containing oligomers for crosslinking purposes. This anionic process is also apparently not able to copolymerize an acrylic acid ester monomer with a methacrylic acid ester monomer.

Conventional free radical initiated processes for preparing low molecular weight acrylic copolymers have exhibited various defects and deficiencies. U.S. Pat. No. 3,028,367 proposed the use of organic thiol compounds for this purpose. These thiol produced products generally have offensive odors, varying color stability and poor outdoor weatherability. Further, the use of high levels of thiol compounds is required, which significantly effects the backbone composition of the polymer formed. U.S. Pat. No. 3,080,348 has suggested that the molecular weight of styrene-acrylate systems may be reduced by increasing reaction temperatures. However, this patent is said not to involve efforts to prepare low molecular weight polymers in the range from 500 to 6,000 as noted by U.S. Pat. No. 4,075,242.

U.S. Pat. No. 4,276,432 describes a process for making acrylic and/or styrenic copolymers with an Mn (as described by vapor phase osmometry) of 750 to 5,000. Reaction solvent is required at addition levels of 40 to 70% by weight of monomers. Long reaction times are employed from 1 to 10 hours. The excessive solvent stripping operation required due to the high levels of solvent employed in the process and the long feed times tend to make this process inefficient in terms of labor and capital expended, unduly time consuming and energy inefficient. The use of excessive amounts of inflammable, toxic and polymer contaminating solvent is a major problem.

Previously, styrene monomer has been homopolymerized to form high molecular weight polymers from 20,000 to 100,000 average molecular weight (Mw) in a continuous mass polymerization process without solvents, catalytic initiators and molecular weight regulators, as disclosed in U.S. Pat. Nos. 2,496,653 and 3,859,268. It has been generally recognized that at temperatures above about 200° C., thermally initiated styrene polymerization produces an undesired molecular weight fraction (dimers, trimers, etc.) causing a wide range of molecular weight and having a high polydispersity (Mw/Mn).

It has been disclosed in U.S. Pat. No. 4,117,235 that batches of an acrylic monomer can be thermally polymerized in sealed glass tubes at temperatures from 230° C.–280° C. to provide an acrylate polymer with a number average molecular weight of less than about 5,000, in the presence or absence of a chain transfer agent or solvent. Excessively long reaction times are proposed of 16–18 hours. The process is conducted as a batch process with a bulk monomer charge and a subsequent long term cook at the reaction temperatures.

U.S. Pat. No. 3,979,352 discloses styrene-acrylic copolymers having an Mn said to be from 600 to 4,000. The process for preparing the copolymers is conducted in a heated tube. No polydispersities or distribution indexes are provided.

In order to provide clear, vinylic copolymers, such as styrene-acrylic copolymers, of high solids content, narrow molecular weight distribution and low solution viscosity, the art has long sought a fast, efficient, high yielding process capable of selectively producing a wide spectrum of hard, soft, alkali-soluble or thermosetting copolymers, which is safe, energy efficient and capable of using existing equipment without undue modifications required for long term, ultra-high temperature operation.

It has been suggested that a continuous bulk polymerization process would be extremely advantageous to provide acrylic copolymers in terms of cost, quality of product and stability. It is understood that solution-type batch processes employing large quantities of solvent and initiator are unsatisfactory, since too many impurities, including solvent, remain in the polymer, the quality of produced polymer is low and efficiency is low, as reported in U.S. Pat. No. 4,328,327. The continuous process proposed therein, however, employs reaction residence times up to 10 hours. It is also noted that when purity is critical, it is advisable not to use a polymerization initiator. Reaction temperatures are said to be below about 160° C.

Accordingly, the art has sought, a continuous bulk polymerization process capable of selectively providing high yields of high purity, low molecular weight vinylic polymers suitable for high solids applications. The term "vinylic polymers" refers to the addition polymer formed by polymerizing vinylic monomers. The vinylic polymers sought should exhibit a narrow molecular weight distribution, low solution viscosity, low dimers and trimers content, low volatiles content, and good color. The process should be energy efficient and adapted for use with conventional equipment.

SUMMARY OF THE INVENTION

These and other objects are attained in a bulk polymerization process for preparing enhanced yields of high solids, low molecular weight vinylic polymer product having a narrow molecular weight distribution and a low chromophore content comprising the steps of continuously:

(a) charging into a continuous mixed reactor zone containing a molten resin mixture;
  (i) mixture of vinyl monomers comprising at least one monoalkenyl aromatic monomer and at least one acrylic monomer;
  (ii) a polymerization initiator in amounts to provide a molar ratio of said initiator to said mixture of vinyl monomers from about 0.0005:1 to 0.04:1;
  (iii) from about 0 to 25 percent based on the weight of vinyl monomers of a reaction solvent, wherein said molten resin mixture comprises unreacted vinylic monomers and the vinylic polymer product;

(b) maintaining a flow rate through said reaction zone sufficient to:
  (i) provide a residence time of said charged vinylic monomer mixture in said reaction zone of at least about two minutes; and
  (ii) maintain a predetermined level of reaction mixture in said reaction zone, and;

(c) maintaining the molten resin mixture at an elevated reaction temperature sufficient to provide accelerated conversion to a readily processable, uniform, concentrated polymer product.

The flow rate in the process of the invention is adjusted to provide, generally, a residence time of monomer mixture in the reaction zone from about 2 to 30 minutes. Reaction temperatures can be from about 180° C. to 270° C. based upon the identity of monomers selected, the levels of initiator and solvent employed, the flow rate selected and the properties of the polymer product desired. The reaction is postulated to be primarily thermally initiated with the polymerization initiator (catalyst) acting to help define the purity, weight distribution, molecular weight and yield of the resulting polymer. The solvent, when employed, assists in reducing viscosity of product and lowering the required reaction temperature, while aiding in reducing molecular weight of the product (possibly as a chain transfer agent) and also improving conversion and uniformity of the product.

It has been found that high solids content vinylic polymers containing on the order from 90–99% non-volatiles, (n.v.) can be produced by the inventive process at a conversion rate of at least about 75% of the theoretical yield (monomer to polymer) The vinylic polymers produced by the process of the invention typically exhibit a polydispersity between about 1.5 and 2, a distribution index less than about 3.3 and an Mn between about 1,000 and 3,000. Unless otherwise indicated, molecular weights are determined employing gel permeation chromatography.

The glass transition temperature of the vinylic polymers produced by the inventive process is essentially molecular weight dependent. The polymer product can often be selectively formed as a solid or liquid depending upon the end use desired. The process can employ conventional continuous stirred reactor equipment.

In general, a mixture of two or more vinylic monomers, preferably including a styrenic and an acrylic monomer, are charged continuously, along with low levels of initiator and optionally low levels of solvent, into a reaction zone containing molten resin having the same ratio of vinyl monomers as in the monomer mixture. The molten resin (and reaction solvent, if present), is maintained at a preset reaction temperature to provide a polymer of desired molecular weight and distribution. The reaction product is pumped out of the reactor zone at the same flow rate as the monomers are charged to provide a fixed level of molten resin in the system.

To reduce the unreacted monomer and/or solvent content of the polymer product, the molten resin mixture may be subjected to a separation means to remove or reduce the content of unreacted monomer and/or solvent and any volatile by-products. Such unreacted monomer and/or solvent may be recovered and reused in the system. Other objects and advantages will be apparent in view of the detailed description of the invention provided.

DESCRIPTION OF PREFERRED EMBODIMENTS

The mixture of vinyl monomers employed to form the vinylic polymer product preferably includes at least one monoalkenyl aromatic monomer and at least one acrylic monomer. The monoalkenyl aromatic monomer to be employed includes, for example, alpha-methyl styrene, styrene, vinyl toluene, tertiary butyl styrene, ortho-chlorostyrene and mixtures thereof.

The term "acrylic monomer" as employed herein includes acrylic or methacrylic acid, esters of acrylic or methacrylic acid and derivatives and mixtures thereof. Examples of suitable acrylic monomers include the following methacrylate esters: methyl methacrylate, ethyl methacrylate, n-propyl methacrylate, n-butyl methacrylate, isopropyl methacrylate, isobutyl methacrylate, n-amyl methacrylate, n-hexyl methacrylate, iso-amyl methacrylate, 2-hydroxyethyl methacrylate, 2-hydroxypropyl methacrylate, N,N-dimethylaminoethyl methacrylate, N,N-diethylaminoethyl methacrylate, t-butylaminoethyl methacrylate, 2-sulfoethyl methacrylate, trifluoroethyl methacrylate, glycidyl methacrylate, benzyl methacrylate, allyl methacrylate, 2-n-butoxyethyl methacrylate, 2-chloroethyl methacrylate, sec-butyl-methacrylate, tert-butyl methacrylate, 2-ethylbutyl methacrylate, cinnamyl methacrylate, crotyl methacrylate, cyclohexyl methacrylate, cyclopentyl methacrylate, 2-ethoxyethyl methacrylate, furfuryl methacrylate, hexafluoroisopropyl methacrylate, methallyl methacrylate, 3-methoxybutyl methacrylate, 2-methoxybutyl methacrylate, 2-nitro-2-methylpropyl methacrylate, n-octylmethacrylate, 2-ethylhexyl methacrylate, 2-phenoxyethyl methacrylate, 2-phenylethyl methacrylate, phenyl methacrylate, propargyl methacrylate, tetrahydrofurfuryl methacrylate and tetrahydropyranyl methacrylate.

Other suitable acrylic monomers include methacrylic acid derivatives such as: methacrylic acid and its salts, methacrylonitrile, methacrylamide, N-methylmethacrylamide, N-ethylmethacrylamide, N,N-diethylmethacrylamide, N,N-dimethylmethacrylamide, N-phenylmethacrylamide and methacrolein.

Typical acrylate esters employed include: methyl acrylate, ethyl acrylate, n-propyl acrylate, isopropyl acrylate, n-butyl acrylate and n-decyl acrylate.

Acrylic acid derivatives employed as the acrylic monomer include: acrylic acid and its salts, acrylonitrile, acrylamide, methyl alpha-chloroacrylate, methyl 2-cyanoacrylate, N-ethylacrylamide, N,N-diethylacrylamide and acrolein.

The acrylic monomer can also include acrylates or methacrylates containing cross-linkable functional groups, such as hydroxy, carboxyl, amino, isocyanate, glycidyl, epoxy, allyl, and the like. The functional polymers are usually prepared by polymerization employing a functional monomer or by post-reaction of a polymer of the invention to introduce the desired functionality.

Esters of methacrylic acid or acrylic acid containing a suitable condensable cross linkable functional group may be used as the monomer. Among such esters are t-butylaminoethyl methacrylate, isopropylidene glyceryl methacrylate and oxazolidinylethyl methacrylate.

Typical preferred cross-linkable acrylates and methacrylates include hydroxy alkyl acrylates, hydroxyl alkyl methacrylates and hydroxyesters of glycidyl acrylates or methacrylates.

Examples of preferred hydroxy functional monomers include 2-hydroxyethyl acrylate, 3-chloro-2-hydroxypropyl acrylate, 2-hydroxy-butyl acrylate, 6-hydroxyhexyl acrylate, 2-hydroxymethyl methacrylate, 2-hydroxypropyl methacrylate, 6-hydroxyhexyl methacrylate, 5,6-dihydroxyhexyl methacrylate and the like.

Hydroxyl or other functionality may also be introduced into the polymers of the invention by post-reacting a nonfunctional polymer using esterification or transesterification techniques.

The present invention is also applied to the preparation of copolymes from mixtures of two or more acrylic monomers such as termonomers and tetramonomers. It is also contemplated that mixtures of at least one acrylic monomer and at least one non-acrylic ethylenic monomer may be polymerized with monoalkenyl aromatic monomers in accordance with the present invention.

Suitable ethylenic monomers include: vinyl pyridine, vinyl pyrollidone, sodium crotonate, methyl crotonate, crotonic acid and maleic anhydride.

Preferred monomer charges include the comonomer charges, such as styrene and acrylic acid, the termonomers, such as styrene, alpha methyl styrene and acrylic acid and the tetramonomers; such as styrene, butyl acrylate, methyl methacrylate and methacrylic acid. By preselecting an appropriate monomer and concentration of such monomer the glass transition temperature, Tg, of the resulting polymer can be modified to provide a harder or softer polymer, as required. Monomers tending to yield higher melting "harder" polymers are, for example, styrenic monomer, and $C_1$-$C_3$ alkyl methacrylates. Monomers tending to yield softer polymers include the acrylates and $C_4$ and higher methacrylates, such as n-butyl acrylate, 2-ethylhexyl acrylate and n-octyl acrylate.

Preferred polymers prepared by the process of the invention include those hard and soft polymers wherein the weight ratio of monoalkenyl aromatic monomer to acrylic monomer is from about 1:5 to 5:1. Especially preferred soft polymers having wide application are those formed from monoalkenyl aromatic monomer and acrylic ester monomer, such as $C_4$-$C_8$ alkyl acrylates and methacrylates. The weight ratio of aromatic monomer to alkyl acrylates and $C_4$ and higher alkyl methacrylates is preferably from 2:1 to 1:2 for such polymers.

Especially preferred polymers which are prepared by the inventive process are the alkali soluble resins having an Mn from 700 to 5000 and an acid number from 140 to 300 comprising at least one monoalkenyl aromatic (styrenic) monomer and at least one acrylic carboxylic monomer, such as acrylic and/or methacrylic acid and, optionally, a non-carboxylic acrylic monomer. Such polymers are disclosed in U.S. Pat. No. 4,013,607, the disclosure of which is incorporated by reference. Typical alkali soluble copolymers are vinyl toluene/acrylic acid, styrene/acrylic acid and styrene/methacrylic acid; terpolymers include styrene/n-butyl acrylate/acrylic acid, styrene/n-butyl methacrylate/acrylic acid and styrene/methyl methacrylate/acrylic acid and tetrapolymers include, styrene/n-butyl acrylate/ethylacrylate/acrylic acid and styrene/alpha methyl styrene/n-butyl acrylate/acrylic acid.

The preferred monomeric charge for preparing alkali soluble polymers employs from about 10-90%, preferably about 60-80% by weight monoalkenyl aromatic monomers, from about 50-10%, preferably about 40-20% by weight of carboxylic acrylic monomer and from about 0-80%, preferably about 0-20% by weight of a non-carboxylic acrylic monomer.

The preferred cross-linkable polymers of the instant invention are thermosetting; that is they have functional groups which are cross-linked through heat reaction with a crosslinking agent. The polymers should contain sufficient functional containing monomers to allow cross linking of the polymers of the invention. Examples of such polymers which may be prepared by the present invention are disclosed in U.S. Pat. Nos. 4,178,320, 4,276,212, 4,276,432 and 4,293,661.

The preferred cross-linkable polymers contain from about 10 to 80% by weight of a styrenic monomer, from about 10 to 50% by weight of an alkyl ester of acrylic or methacrylic acid and from about 20 to 50% by weight of a hydroxy alkyl acrylate or alkyl methacrylate. The styrenic monomer is preferably styrene or and/or alpha-methyl styrene. The alkyl ester of acrylic or methacrylic acid has alkyl groups having from one to eight carbon atoms and includes, for example, the methyl, ethyl, propyl, butyl, isobutyl, isoamyl, 2-ethylhexyl and octyl, acrylates and methacrylates.

The hydroxy alkyl acrylates and methacrylates contain an alkylene group having from 2 to 6 carbon atoms to which the hydroxy group is attached. Examples of these monomers are hydroxyethyl acrylate or methacrylate, hydroxypropyl acrylate or methacrylate and hydroxyhexyl acrylate or methacrylate. Other copolymerizable monomers can also be utilized.

Preferred thermosetting polymers include the terpolymers, such as styrene/2-ethylhexyl acrylate/hydroxyethyl methacrylate, styrene/methyl methacrylate/hydroxyethyl methacrylate and styrene/butyl acrylate/hydroxyethyl methacrylate. The styrenic monomers are preferably employed in amounts from about 20-50% by weight the alkyl esters of acrylic or methacrylic acid are preferably employed in amounts from about 10 to 40% by weight and the hydroxy monomers are preferably employed in amounts from about 20 to 50% by weight.

The thermosetting polymers by the inventive process prepared may be solids or liquids at room temperature. For the purposes of this invention a polymer is considered a liquid, if it has a Gardner-Holdt Viscosity, measured at 25° C., of less than about Z-6.

The identity and amounts of cross-linking agent are preselected taking into consideration the glass transition temperature ($T_g$) of the thermosetting polymer to provide a solid or liquid applications composition, as desired. Accordingly, by preselecting the appropriate polymer and crosslinker, liquid products may be obtained. As such, they may be used alone, without solvents, in many coating applications.

Examples of curing agents which may be utilized for cross-linking the polymeric products include polyepoxides, polyisocyanates and urea-aldehyde, benzoguanamine aldehyde, or melamine-aldehyde condensation products and the like. Particularly desired are the melamine-formaldehyde condensation products, such as polymethoxymethyl melamines, preferably hexamethoxymethylmelamine. When melamine-formaldehyde or urea-formaldehyde curing agents are utilized, it is preferred that an acid catalyst, such as toluene sulfonic acid, be employed to increase the cure rate. Typically, these cross-linking curing agents are products of reactions of melamine or urea, with formaldehyde and various alcohols containing up to and including 4 carbon atoms. These liquid cross linking agents have substantially 100 percent nonvolatile content as measured by the foil method at 45° C. for 45 minutes. For the purposes of the invention it should be recognized that it is important not to introduce extraneous diluents that would lower the final solids content of the coating.

Particularly preferred cross linking agents are those sold by American Cyanamid under the trademark "Cymel". In particular, Cymel 301, Cymel 303 and Cymel 1156, which are alkylated melamine-formaldehyde resins are useful in the compositions of this invention.

The initiators suitable for carrying out the process according to the present invention are compounds which decompose thermally into radicals in a first order reaction, although this is not a critical factor. Suitable initiators preferably have half-life periods (pot-lives) in the radical decomposition process of about 1 hour at 90° C. and more preferably 10 hours at 100° C. Others with about 10 hour half-lives at temperatures significantly lower than 100° C. may also be used. Suitable initiators are, for example, aliphatic azo compounds such as 1-t-amylazo-1-cyanocyclohexane, azo-bis-isobutyronitrile and 1-t-butylazo-cyanocyclohexane and peroxides and hydroperoxides, such as t-butylperoctoate, t-butyl perbenzoate, dicumyl peroxide, di-t-butyl peroxide, t-butyl hydroperoxide and cumene hydroperoxide and the like.

The initiator is preferably added simultaneously with the monomers. For this purpose it is either admixed with the monomer feed or added to the process as a separate feed. Initiator levels are an important consideration in the process of this invention.

Thermally initiated polymerization of styrene/acrylic monomers has been carried out without the use of initiators. However, in order to obtain low molecular weight products, between Mn 1000 and 1500, for example, it is necessary to carry out this reaction at temperatures at least about 275° C. and usually approaching 300° C. At such temperatures various problems have surfaced. Undue quantities of dimers and trimers are formed at these high temperatures. For this polymer-monomer system the ceiling temperature (the temperature at which the rate of polymerization equals the rate of depolymerization or unzipping) is high. Near the ceiling temperature, the competition between polymerization and depolymerization leads to a lowering of polymerization rate and of the molecular weight of the resulting polymer.

This phenomenon, in turn, accounts, in part, for the presence of excessive amounts of impurities and chromophores (colored bodies which are formed at temperatures above about 275° C.). Further, at high reaction temperatures, excessive demands can be placed on valves, seals and fittings in conventional polymerization equipment. There exists a greater tendency for breakdowns, leaks and overheating at such elevated temperatures.

Accordingly, it has been found that when the molar ratio of initiator to monomers charge is at least about 0.0005:1, it is possible to reduce the reaction temperature to improve purity, color, conversion and ease processing conditions, while maintaining or improving low molecular weight and molecular weight distribution. In addition, the yields of polymer product recovered, without recycle, can be on the order of at least 75% of the theoretical. When yields lower than about 75% of theoretical are produced, then, during recycle of the product to improve yields, various problems are encountered. For example, the ratios of unreacted monomers can vary widely, especially at substantially lower yields. Upon recycling, the polymer thus produced can be quite different in proportions of monomers from that desired. The solids content of the product will also suffer and the quality will be compromised. Also the added volume of product to be recycled requires additional monitoring and storage equipment.

It is possible to mitigate the effects of reduced conversion by adjusting the feed during recycling to take into account the presence of varying ratios of unreacted monomers.

Depending upon the identity of monomers selected, it may be that the product will benefit from the adjustment of the feed content, even at higher conversions.

Use of excess initiator is costly and does not significantly improve either the properties of the resulting polymer nor the reaction conditions sufficiently, to normally justify its use. Accordingly, in general, a mole ratio no greater than about 0.04:1 of initiator to total monomers charge need be employed. If desired, a somewhat higher ratio may be employed, under certain circumstances, usually up to about 0.06:1, to provide another means to reduce the molecular weight and improve distribution of the resulting product. However, best conversion and weight distribution is usually achieved with the mole ratio at 0.0005:1 to 0.04:1. It is believed that the present reaction is primarily thermally initiated, with the minor amounts of initiator utilized cooperating to permit reduced reaction temperatures and improving conversion and distribution characteristics. Therefore, sufficient amounts of initiator are employed for this purpose.

It is particularly preferred for industrial purposes to employ a molar ratio of about 0.005:1 to 0.015:1 of initiator to monomers.

If desired, from about 0 to 25 percent and preferably from 0 to 15 percent of reaction solvent is employed based on the weight of monomers. The solvent, when employed, is added simultaneously with the vinyl monomers feed or is added to the reaction as a separate feed. The selection of a particular solvent and its level of addition are made, inter alia, based on the monomers selected, the desired applications for the polymer produced and also to assist in controlling reaction parameters. In general, it is preferred to use as little solvent as possible to reduce separation and recovery requirements and minimize the formation of contaminants. It is postulated that the chain transfer effects of solvents may contribute to the production of excess dimers, trimers and to the production of by-product chomophores.

In general, the use of a solvent permits a lower reaction temperature to be employed, allows lower flow rates, reduces the solution viscosity of the molten polymer product, acts as a heat sink to prevent run-away reactions and reduce cooling requirements, assists in plasticizing the polymer product and reduces the acid number and molecular weight of the resulting product.

Most conventional polymerization or reaction solvents may be utilized in the present process to prepare the low molecular weight polymers of the instant invention. The higher boiling solvents are preferred due to their low pressure at high temperatures. In general, solvents having a boiling point above 100° C., especially 150° C. are more preferred. Examples of such higher boiling solvents include the aromatic alcohols, such as benzyl alcohol, the toluene alcohols and the like; the alcohol and glycol ethers, esters and mixed ethers and esters, such as diethylene glycol, Cellosolve (registered trademark of the Union Carbide Corporation), butyl Cellosolve, Cellosolve acetate, the Carbitols (registered trademark of the Union Carbide Corporation), the glymes and diglymes and the like.

In addition, some glycols may also be utilized as the reaction solvent including ethylene, propylene and butylene glycols and their various polyether analogs. The aliphatic alcohols, such as hexanol and decanol, can also be used. Further, various hydrocarbon fractions may be utilized with the most preferred being Solvesso 150 or Solvesso 100 (a registered trademark of the Humble Oil and Refining Company.) Aromatic solvents can also be employed, for example, toluene, xylene, cumene, and ethyl benzene.

The preferred solvents are the glymes and diglymes, also known as (poly)alkylene glycol dialkyl ethers, especially ethylene glycol dimethyl ether and diethylene glycol dimethyl ether.

The molten resin mixture in the reaction zone is maintained at an elevated reaction temperature sufficient to provide accelerated conversion to a readily processable, uniform, concentrated polymer product. In general, for these and other purposes the reaction temperature is preferably maintained at from about 180° C. to 270° C. At temperatures below about 180° C., the polymer product tends to exhibit a higher molecular weight and broader molecular weight distribution than generally accepted for high solids applications, unless excessive solvent addition is employed. The reaction conversion rate is reduced and higher molecular weight fractions are also increased. The product tends to become unduly viscous for efficient processing and high solids products cannot be obtained readily.

At reaction temperatures from about 180° C. to about 215° C., it is often useful to employ a solvent of the invention to increase conversion rate, increase uniformity of the product, obtain fewer chromophores, and reduce viscosity. If desired, the amount of initiator employed may be increased in accordance with the invention to improve reaction parameters and enhance product properties.

At reaction temperatures above about 270° C., the quality of the product is often compromised. For example, at higher reaction temperatures the polymer products tend to be discolored and exhibit undesired yellowing, possibly caused by formation of undesired by-products, such as oxidation products. Further, the resulting polymer products may be subjected to excessive ceiling temperature effects as depolymerization, reversible reactions and other side reactions which can yield dimers, trimers and other low molecular weight oligomeric contaminants. Such by-products contaminate the product polymer and can contribute to its off-color or can cause substandard finishes from coating compositions made from them. In addition, reaction equipment tends to degrade rapidly at such elevated temperatures, which can cause leaking of reaction mix from valves, fittings and seals.

In general, best results are obtained and accordingly, it is more preferred to employ reaction temperatures from about 215° C. to 270° C.

In general, the reaction time or residence time in the reaction zone is controlled by the rate of flow of constituents through the reaction system. The residence time is inversely proportional to flow rate. It has been found that at a given temperature, the molecular weight of the polymer product decreases as the residence time increases.

In accordance with these factors it is therefore preferred to utilize reaction residence times of at least about 2 minutes to provide satisfactory reaction completion. It has been found that employing residence times under 2 minutes leads to lower yields of product having a broader distribution. Additionally, steady state reaction conditions are difficult to achieve. While the residence time in the reaction zone may be as long as 1 hour at lower reaction temperatures, normally discoloring reactions and other side reactions will dictate that shorter residence times be employed. For most cases a residence time of from about 2 to 35 minutes, and, preferably, from 2 to 20 minutes is preferred. In general, longer residence times increase the yield of product, but the rate of increase of product is generally very slow after about 30 minutes of reaction. In addition after about 30 minutes, depolymerization tends to occur with formation of undesired chromophores and by-products.

The particular flow rate selected will depend upon the reaction temperature, constituents, desired molecular weight of product, desired polydispersity and the particular equipment employed.

For best results, to produce a given resin of a desired Mn and Mw with low residual monomer, the reaction temperature and residence times are mutually manipulated in accordance with the principles provided herein.

The reaction pressure in an enclosed system is a function of residual vapor pressure of unreacted monomer and other volatiles present either in the feed (such as water) or in the reaction mix side reaction products. Although at steady state the process is carried out under a positive pressure, the reaction pressure appears to have no significant effect on the yield. The upper limit of reaction pressure is a function of equipment capability, while the lower limit is a function of feed rate and monomer composition. At higher temperatures, the higher gas pressures which result may require special equipment and procedures for safe handling.

The polymers produced by the process of the invention suitable for high solids applications have an Mn from about 500 to about 6000, preferably from about 750 to 5000 and most preferably from about 1000 to 3000. When such resins are employed, with or without an applications solvent, depending upon their Tg and final use, they should exhibit a viscosity from about 0.1 to about 5 poise, preferably from about 0.5 to 1 poise. This corresponds to a Gardner-Holdt value of A-4 to S and A-D respectively. For this and other purposes the polydispersity ratio for the polymers produced by the inventive process is less than about 2.5 and more preferably less than about 2 and most preferably from about 1.5 to 2. The distribution index should be less than about 4.5, and for best results, should preferably be less than about 3.3.

The present process is adapted to achieve yields, without recycle, of at least about 75% of theoretical. With proper selection of reaction parameters and monomers in accordance with the detailed description of the invention provided, yields from 90 to 99% of theoretical are regularly achieved at residence times from 2 to 20 minutes and with a nonvolatile content from 90 to 99%.

The thermosetting and soft-monomer-containing, vinylic polymers are typically recovered as liquid resins, while the hard monomer vinylic resins, such as the hard alkali-soluble resins are recovered as solids, upon cooling. Such alkali-soluble polymers are readily converted to resin cuts by neutralization with ammonia or other bases.

The high solids thermoset, cross-linkable polymers have many applications. They are readily formulated into enamel appliance coatings, overprint varnishes, adhesives and auto-, truck-or airplane exterior finishes, coatings, and the like. The hard and soft high solids, addition polymers are readily formulated into floor finishes, ink dispersants, water based clear overprint varnishes, impregnants, binders, plasticizers, leveling agents, melt flow improvers and the like.

By employing the polymers of the invention, essentially solvent-free coatings systems may be obtained having usable viscosities at room temperature, which systems are applicable in standard industrial coating processes, including hog spraying, roll coating and the like. The products prepared from the process of the invention are formulated into such coating systems by addition of solvents, fillers, pigments, flow control agents and the like. Such coatings can be applied, with the addition of conventional adjuvants, to cans, coils, fabrics, vinyl, paper, metal furniture, wire, metal parts, wood paneling and the like.

The alkali soluble resins may be formulated into resin cuts employing available aqueous bases, to provide exceptional leveling and detergent-resistant properties when incorporated into a floor polish composition with a suitable metallized acrylic, methacrylic or copolymer emulsion, a wax emulsion, and adjuvants such as plasticizers, surfactants, anti-foaming agents of organic solvents and/or organic bases. The wax formulations yield exceptional gloss, color-free finishes, and are highly resistant to yellowing and detergent action.

Inks with excellent adhesion properties can be formulated with the instant polymers as binding agents.

The process of the present invention involves the use of a variable fillage type stirred reactor for the polymerization of vinylic monomers to copolymers having a narrow-molecular weight distribution by the proper balancing of the conditions of polymerization and flow rates. The reaction zone can comprise a continuous stirred tank reactor of any type adapted for variable fillage operation of from as low as 10% to 100% of the usable volume thereof for the production of vinylic polymers. This continuous stirred tank reactor may be either horizontal or vertical and should have provision for close control of the temperature therein by any desired means, including control by a cooling jacket, internal cooling coils or by withdrawal of vaporized monomer followed by condensation thereof and return of the condensed monomer to the reaction zone. It will be apparent to those skilled in the art that this reaction zone can, if desired, be constituted by a plurality of continuous stirred tank reactors operated in series. Likewise, it will be apparent that such reaction zone can comprise more than one continuous stirred tank reactor operated in parallel, if it is desired to employ several relatively small reactors to supply the capacity of the final reaction zone rather than a single large reactor for that purpose.

It is within the scope of the invention to modify an extruder or a back mix reactor to permit the process to be conducted therein.

A preferred form of continuous stirred reactor which has been found quite suitable for carrying out the process is a tank reactor provided with cooling coils sufficient to remove any heat of polymerization not taken up by raising the temperature of the continuously charged monomer composition so as to maintain a preselected temperature for polymerization therein. Preferably such a continuously stirred tank reactor will be provided with at least one and usually more, vaned agitators driven by an external power source, such as a motor. At least one such agitator is positioned to provide agitation of liquid contained in the reactor while operating at minimum fillage, i.e., as low as 10% of the volume thereof. Such a continuous stirred tank reactor can, if desired, be provided with additional features for improved efficiency of operation and safety, such as an additional series of internal cooling coils adapted to effectively prevent any "run-away" polymerization if the normal holding period has to be extended for some reason and an outer jacket for additional cooling or heating of the contents of the reactor.

In operating the present continuous bulk, polymerization process, flexibility and range of choice can be realized in polymer types produced, as well as in the production rate thereof, by proper choice of polymerization reaction conditions. In operation, a monomer feed composition comprising polyalkenyl aromatic and acrylate monomers and an initiator as described above, is charged to the reactor and the temperature of the monomer feed is raised to from about 180° C. to 270° C. to induce polymerization. The reactor is charged from a stirred feed tank which contains the reaction charge of monomers. Pressure in the reactor can vary from 40 to 400 psia or even higher.

After the initial fillage of the reactor to the desired preselected level and polymerizing the charged monomer to approximately the desired solids content, the volume of monomer composition charged thereto is adjusted to a value to maintain such preselected level of liquid in the reactor. Thereafter, the liquid mixture of polymer and monomer is withdrawn from the reactor, to maintain the preselected level of such liquid mixture in the reaction zone. Polymerization conditions are continuously maintained in the reactor to produce a polymer of selected molecular weight and selected degree of conversion or weight percent solids of polymer in such liquid mixture. The reaction zone can be operated so as to produce a liquid mixture with a polymer concentration or percent solids from as low as about 50 percent to as high as 99 percent by weight. The level of fillage of the reactor can vary from as low as 10 percent to as high as 100 percent of usable volume and may be controlled by any desired means, for example, a level controller and associated valve or pump in the transfer line from the reactor.

Any desired means of controlling the temperature within the reactor may be employed. It is preferred that the temperature be controlled by circulation of a cooling fluid, such as oil, through internal cooling coils in those reactors so equipped. The entry of relatively cool monomer composition serves to remove the greater proportion of the heat of polymerization released and the internal cooling coils serve to remove the remainder so as to control the temperature of the liquid mixture therein to a preselected value and thus produce a polymer of the desired degree of conversion and average molecular weight and distribution.

As the polymer concentration increases, the possibility of damage from "run-away" reactions is substantially reduced. In general it is preferred to produce in the reaction zone a solids content of from 80 to 99% by weight of the polymer of Mn from about 1000 to 3000 and of relatively narrow molecular weight distribution. The residence time in the reaction zone can vary from about 2 to 60 minutes.

After reaction, the resulting mixture is subjected to separation and product recovery. Unreacted monomer is preferably recycled to the monomer feed. During the separation step, volatile components, such as solvent and other byproducts are vaporized and recycled, where appropriate. Also, during separation the reaction mix is preferably conducted to a devolatizer, which vaporizes volatile components from the mix. For this step, conventional equipment is readily available, such as a thin film evaporator.

In general, the equipment for the present process is known to the art and has been described for use in other bulk polymerization procedures, as in U.S. Pat. No. 3,968,059 and U.S. Pat. No. 3,859,268.

During the recovery step, the resin product pumped from the devolatizer can be solidified by appropriate means or cut into an appropriate solvent system. The resin product may be solidified by employing a conventional flaker. The product flakes can be packaged in accordance with known techniques. For example, the flakes may be conducted to a flake bin by suction and then transported to a bagger.

The following examples are set forth to illustrate more clearly the principles and practice of this invention to one skilled in the art. As such, they are not intended to limit the invention but are illustrative of certain preferred embodiments. In these Examples, the molecular weight of polymer product was determined by conventional gel permeation chromatography methods.

EXAMPLE I

A vertical stirred tank reactor of one gallon capacity, which was cooled or heated with oil, was heated to and maintained at, a reaction temperature of 238° C. The reactor was thereafter filled to 50% of its volume with a mixture of 26 parts styrene (S), 39 parts butyl acrylate (BA) and 35 parts hydroxy ethylmethacrylate (HEMA), conveniently represented as 26S/39BA/35HEMA, and di-tertbutyl peroxide in a 0.01:1 molar ratio to the monomers. The reaction mix was metered in from a feed tank at a constant delivery rate. Polymerization was immediately initiated as the mix was introduced into the reactor. The contents of the tank reactor A cross-linkable terpolymer was produced having a $M_n$ of 1510, a polydispersity ratio of 1.85 and a distribution of 3.38.

EXAMPLE II

In order to demonstrate the effect of initiator content on the molecular weight and distribution of cross-linkable, thermosetting polymers prepared in accordance with the present invention, test runs were conducted in accordance with the procedure of Example I. For each run the monomer charge, reaction temperature T(in °C.), residence time, R (in minutes), initiator content (in mole ratio of initiator to monomers), number average molecular weight, $M_n$, weight average $M_w$, and sedimentation average molecular weight $M_z$ were measured. Polydispersity (W/N) and distribution index (Z/N) were calculated from the measured weights. Conversion rate is in % of theoretical yield. The test results are set forth in Table 1 as follows:

TABLE 1

| Monomer Composition | Reaction Temp. °C. | R (Min.) | Initiator | Mn | Mw | Mz | W/N | Z/N | Conversion (%) |
|---|---|---|---|---|---|---|---|---|---|
| * ** *** | | | | | | | | | |
| 37S/38 2-EHA/25 HEMA | 240 | 15 | none | 4560 | 13,200 | 39,200 | 2.89 | 8.62 | — |
| 37S/38 2-EHA/25 HEMA | 240 | 15 | 0.004[1] | 2470 | 5300 | 11,100 | 2.15 | 4.49 | — |
| 37S/38 2-EHA/25 HEMA | 240 | 15 | 0.008[1] | 2260 | 4400 | 8,200 | 1.95 | 3.63 | — |
| 26S/39BA/35 HEMA **** | 239 | 10 | 0.02 | 1320 | 2400 | 4,500 | 1.82 | 3.41 | 92.7 |

*S is styrene
**2-EHA is 2-ethylhexyl acrylate
***HEMA is hydroxy ethyl methacrylate
****BA is butyl acrylate
[1]cumene hydroperoxide initiator were continuously stirred. After the reactor was filled to 50% of capacity, an outlet port was opened and the reaction mix was continuously withdrawn. Simultaneously, fresh feed was added to maintain the 50% fillage level in the reactor. For this purpose the feed rate was maintained at 0.4 pound per minute per gallon of reactor to achieve a residence time of ten minutes. Oil was circulated through a reactor jacket to maintain a constant reaction temperature of 238° C.

Unless otherwise noted the initiator employed in the following examples was di-tertbutyl peroxide.

Thereafter the reaction mix was introduced into a thin film evaporator at which time the volatile components, including unreacted monomers and by-products, The results clearly demonstrate the unexpected effects on weight and distribution imparted to the polymers by the use of initiator.

EXAMPLE III

In order to demonstrate the effect of reaction temperature on the thermoset polymer product of the present invention test runs were carried out according to the procedure of Example I and were reported in accordance with the procedure of Example II, with the exception that a reaction solvent diethylene glycol dimethyl ether (Diglyme) was employed by incorporating it in the reaction feed and reaction zone. The test results are provided in Table 2 as follows:

TABLE 2

| Monomer Composition | Reaction Temp. °C. | R (Min.) | Solvent wt. % | Initiator % | Mn | W/N | Z/N | Conversion (%) |
|---|---|---|---|---|---|---|---|---|
| * | | | | | | | | |
| 40S/25MMA/35HEMA | 180 | 30 | Diglyme 25% | 0.04 | 1790 | 1.84 | 3.13 | 99.0 |
| 40S/25MMA/35HEMA | 190 | 30 | Diglyme 25% | 0.04 | 1310 | 1.83 | 3.13 | 96.0 |
| 40S/25MMA/35HEMA | 205 | 30 | Diglyme 25% | 0.02 | 1170 | 1.80 | 2.97 | 94.0 |
| 40S/25MMA/35HEMA | 215 | 15 | Diglyme 10% | 0.02 | 1200 | 1.85 | 3.13 | 92.4 |
| 40S/25MMA/35HEMA | 238 | 15 | Diglyme 10% | 0.02 | 850 | 1.62 | 2.56 | 86.5 |
| 40S/25MMA/35HEMA | 248 | 15 | Diglyme 10% | 0.02 | 740 | 1.55 | 2.45 | 82.8 |
| 37S/38 2-EHA/25HEMA | 250 | 15 | Cellosolve acetate 25% | 0.008[1] | 1650 | 1.64 | 2.66 | — |

*MMA is methylmethacrylate
[1]cumene hydroperoxide initiator were evaporated and a polymer product was recovered. The yield of product was 90.3% of theoretical.

The results show that at the preferred reaction temperature range, a preferred high solids polymer can be produced with low molecular weight and narrow weight distribution by selecting appropriate quantities of initiator and/or solvent within the scope of the invention.

EXAMPLE IV

In order to illustrate the effects of solvent level on the process of the invention and the thermosetting products produced thereby, test runs were conducted in accordance with the procedure of Example III and the results reported in Table 3 as follows:

TABLE 3

| Monomer Content | Reaction Temp. °C. | Resid. Time (Min.) | Solvent (% Wt.) | Initiator[1] % | Mn | W/N | Z/N |
|---|---|---|---|---|---|---|---|
| 37S/38 2-EHA/25HEMA | 240 | 15 | 0 | 0.008 | 2260 | 1.95 | 3.63 |
| 37S/38 2-EHA/25HEMA | 250 | 15 | Cellosolve Acetate/10 | 0.008 | 1930 | 2.02 | 4.25 |
| 37S/38 2-EHA/25HEMA | 240 | 15 | Cellosolve Acetate/15 | 0.008 | 1950 | 1.85 | 3.33 |
| 37S/38 2-EHA/25HEMA | 250 | 15 | Cellosolve Acetate/25 | 0.008 | 1650 | 1.64 | 2.66 |

[1]cumene hydroperoxide initiator

The test results demonstrate the effects of solvent addition in reducing molecular weight and in providing a narrower molecular weight distribution for the polymer products.

EXAMPLE V

In order to demonstrate the effects of initiator level on alkali-soluble polymers of the invention, test runs were conducted in accordance with the procedure of Example I and solvent was employed in the reactor feed in accordance with the procedure of Example II. The results of the tests are reported in Table 4 as follows:

TABLE 4

| Monomer Composition | Reaction Temp. °C. | Initiator | Resid. Time (Min.) | Solvent % by Wt. | Mn | W/N | Z/N |
|---|---|---|---|---|---|---|---|
| *    ** | | | | | | | |
| 48S/20AMS/32AA | 227 | 0.0 | 20 | Carbitol/10 | 4950 | 2.10 | 4.02 |
| 48S/20AMS/32AA | 227 | 0.005 | 20 | Carbitol/10 | 2490 | 1.89 | 3.45 |
| 48S/20AMS/32AA | 227 | 0.01 | 20 | Carbitol/10 | 2020 | 1.83 | 3.47 |
| 31S/37AMS/32AA | 237 | 0.027[1] | 20 | Cellosolve Acetate/10 | 2330 | 1.60 | 2.43 |
| 31S/37AMS/32AA | 227 | 0.04[1] | 20 | 0 | 2280 | 1.59 | 2.40 |
| 31S/37AMS/32AA | 226 | 0.06 | 16 | 0 | 1230 | 1.48 | 2.16 |

*AMS is alpha-methyl styrene
**AA is acrylic acid
[1]cumene hydroperoxide

The results show that the initiator levels are a key factor in preparing low molecular weight polymers, such as alkali-soluble resins, having a narrow weight distribution.

EXAMPLE VI

In order to illustrate the effects of residence time on the present process and the alkali-soluble resin products produced thereby, test runs were conducted in accordance with the procedure of Example V. The solvent employed was diethylene glycol dimethyl ether (Diglyme) at 10% by weight and the initiator was di-tertbutyl peroxide employed at a molar ratio of 0.015:1 to the monomers charge. Gardner viscosity was reported as a 40% non-volatiles cut in Carbitol. Color was measured on the samples of the 40% n.v. cut and is expressed in Gardner color. The Gardner color scale ranges from 1 to 18, with 1 representing a clear, colorless material. The test results are reported in Table 5 as follows:

TABLE 5

| Monomer Composition | Reaction Temp. °C. | Residence Time (Min.) | Mn | W/N | Z/N | Conversion (%) | Gardner Viscosity | Color |
|---|---|---|---|---|---|---|---|---|
| 31S/37AMS/32AA | 249 | 1 | 3020 | 2.05 | 3.38 | 68.0 | X | 1 |
| 31S/37AMS/32AA | 247 | 2 | 2350 | 1.70 | 2.55 | 81.6 | T | 1 |
| 31S/37AMS/32AA | 249 | 3 | 2110 | 1.66 | 2.51 | 83.9 | Q | 1 |
| 31S/37AMS/32AA | 252 | 5 | 1990 | 1.63 | 2.42 | 86.7 | O | 1 |
| 31S/37AMS/32AA | 252 | 10 | 1790 | 1.57 | 2.32 | 88.9 | O | 1 |
| 31S/37AMS/32AA | 252 | 15 | 1680 | 1.57 | 2.34 | 88.6 | J | 1 |
| 31S/37AMS/32AA | 251 | 30 | 1350 | 1.52 | 2.21 | 87.9 | H | 2 |
| 31S/37AMS/32AA | 250 | 60 | 1250 | 1.49 | 2.15 | 87.3 | F | 4 |

The results clearly illustrate that at residence times below about 2 minutes, conversion of monomer to polymer is incomplete, molecular weight and distribution are higher and viscosity is higher. At residence times above about 30 minutes, impurity levels rise with little additional improvement in molecular weight or distribution.

EXAMPLE VII

In order to illustrate the effects of reaction temperature on alkali soluble resins produced by the present process, test runs were conducted according to Example V. The results are reported in Table 6 as follows:

TABLE 6

| Monomer Composition | Reaction Temp. °C. | Residence Time (min.) | Initiator | Solvent % by wt. | Mn | W/N | Z/N | Conversion (%) | Gardner Color |
|---|---|---|---|---|---|---|---|---|---|
| 31S/37AMS/32AA | 193 | 15 | 0.005 | benzyl alcohol 15 | 7260 | 2.23 | 3.68 | 78.4 | — |
| 31S/37AMS/32AA | 199 | 34 | 0.015 | benzyl alcohol 15 | 2440 | 1.76 | 2.79 | 100.0 | 1 |
| 31S/37AMS/32AA | 211 | 15 | 0.005 | benzyl alcohol 15 | 5720 | 1.99 | 3.20 | 87.1 | — |
| 31S/37AMS/32AA | 213 | 15 | 0.015 | benzyl alcohol 15 | 2290 | 1.66 | 2.49 | 100.0 | 1 |
| 48S/20AMS/32AA | 227 | 20 | 0.01 | Carbitol 10 | 2020 | 1.83 | 3.47 | — | — |
| 48S/20AMS/32AA | 249 | 20 | 0.01 | Carbitol 10 | 1470 | 1.56 | 2.41 | — | — |
| 31S/37AMS/32AA | 270 | 29 | 0.015 | benzyl alcohol 15 | 860 | 1.35 | 1.83 | 93.0 | 6 |

[1] 40% carbitol cut

The results show that as reaction temperature increases, molecular weight and distribution, decrease. As temperatures reach about 270° C., the presence of chromophores becomes an important factor. At temperatures below about 215° C., the need for selecting appropriate residence times, solvent quantity and initiator quantity to provide low molecular weight polymers having a narrow weight distribution is shown to become particularly important.

EXAMPLE VIII

In order to demonstrate the effects of initiator and reaction temperature on high solids, softer polymers of the invention which are liquid at room temperature, tests were run according to the procedures of Examples I and II. For comparison purposes some runs were conducted without initiator and solvent, while others were conducted with initiator and/or solvent. The results are reported in Table 7 as follows:

TABLE 7

| Monomer Comp. | React. Temp. °C. | Resid. Time (min) | Init. | Solvent % Wt. | Mn | W/N | Z/N | Gardner Viscosity | Gardner Color | Conv. |
|---|---|---|---|---|---|---|---|---|---|---|
| 15 35 50 | 298 | 30 | 0.0 | 0.0 | 920 | 1.24 | 1.57 | B | 13 | 73.4 |
| S/AMS/2-EHA | 270 | 15 | 0.0 | 0.0 | 1,350 | 1.57 | 2.26 | L | 2 | 73.8 |
|  | 212 | 15 | 0.0 | 0.0 | 6,500 | 1.82 | 2.77 | Z-7 | +1 | 59.7 |
|  | 167 | 15 | 0.0 | 0.0 | 13,750 | 2.07 | 3.20 | — | — | 12.7 |
| 15 35 50 | 266 | 17 | 0.0 | Benzyl | 1,320 | 1.53 | 2.30 | M | 11 | 61.6 |
| S/AMS/2-EHA | 212 | 14 | 0.0 | Alcohol | 4,870 | 1.79 | 2.67 | Z-6 | 6 | 46.2 |
|  | 185 | 14 | 0.0 | 25% | 7,410 | 1.96 | 3.02 | — | — | 21.2 |
|  | 160 | 14 | 0.0 |  | 10,230 | 2.18 | 3.51 | — | — | 8.9 |
| 15 35 50 | 267 | 17 | 0.0005 | Benzyl | 1,300 | 1.49 | 2.12 | J | 8 | 62.4 |
| S/AMS/2-EHA | 211 | 17 | 0.0005 | Alcohol | 4,690 | 1.77 | 2.66 | Z-5 | 6 | 48.1 |
|  | 184 | 17 | 0.0005 | 25% | 6,830 | 1.99 | 3.05 | Z-9 | 3 | 27.3 |
|  | 160 | 17 | 0.0005 |  | 10,020 | 1.89 | 2.94 | — | — | 14.5 |
| 15 35 50 | 296 | 30 | 0.015 | 0.0 | 830 | 1.23 | 1.52 | B | 7 | 72.8 |
| S/AMS/2-EHA | 271 | 15 | 0.015 | 0.0 | 1,160 | 1.34 | 1.78 | E | 1 | 76.6 |
|  | 211 | 15 | 0.015 | 0.0 | 3,140 | 2.04 | 3.89 | Z-3 | +1 | 88.0 |
|  | 172 | 15 | 0.015 | 0.0 | 7,300 | 2.52 | 6.88 | Z-8 | +1 | 79.3 |
| 15 35 50 | 212 | 14 | 0.015 | Benzyl | 2,550 | 1.73 | 2.71 | Z-2 | −1 | 82.1 |
| S/AMS/2-EHA | 182 | 13 | 0.015 | Alcohol | 4,370 | 1.78 | 3.16 | Z-8 | 1 | 80.3 |
|  | 158 | 29 | 0.015 | 15% | 2,370 | 1.77 | 3.00 | Z-10 | 6 | 83.5 |
| 15 35 50 | 270 | 15 | 0.04 | 0.0 | 1,090 | 1.31 | 1.72 | E | 4 | 78.1 |
| S/AMS/2-EHA | 212 | 15 | 0.04 | 0.0 | 2,250 | 2.13 | 4.89 | Z | −1 | 90.5 |
|  | 189 | 15 | 0.04 | 0.0 | 3,510 | 4.59 | 28.18 | Z-7 | −1 | 89.0 |
| 15 35 50 | 270 | 15 | 0.04 | Benzyl | 880 | 1.24 | 1.57 | C | 11 | 73.6 |
| S/AMS/2-EHA | 179 | 15 | 0.04 | Alcohol | 2,410 | 1.70 | 2.70 | — | — | 86.1 |
|  | 160 | 26 | 0.04 | 25 | 2,740 | 1.90 | 3.28 | — | — | 85.7 |
| 15 35 50 | 270 | 15 | 0.06 | 0.0 | 1,000 | 1.30 | 1.69 | D | 3 | 80.4 |
| S/AMS/2-EHA | 212 | 15 | 0.06 | 0.0 | 1,990 | 2.11 | 4.87 | Z-2 | −1 | 88.7 |
|  | 188 | 15 | 0.06 | 0.0 | 3,040 | 5.99 | 43.39 | Z-6 | −1 | 87.7 |

[1] Gardner Viscosity and Color were measured in 80% N.V. cuts in xylene.

The results obtained illustrate that conversion of monomers to polymer is incomplete especially at low reaction temperatures, when initiator levels are excessively reduced. The beneficial effects of solvent at reaction temperatures below about 215° C. are shown, particularly with regard to enhancement of molecular weight and weight distribution. It is clear that the process of the invention can provide high yields of quality, low molecular weight, high solids polymers with a narrow weight distribution at reaction temperatures as low as 215° C. and even as low as 180° C., providing the reaction parameters are properly preselected.

Similar results were obtained when other initiators, such as tert-butylperbenzoate and cumene hydroperoxide are substituted for the di-tertbutyl peroxide initiator.

EXAMPLE IX

A terpolymer of 26S/39BA/35HEMA was prepared according to the procedure of Example 1 employing a reaction temperature of 249° C., a residence time of 10 minutes and a di-tertbutyl peroxide initiator ratio to monomers of 0.01:1. The polymer had an Mn of 1270, a (W/N) of 1.75, a (Z/N) of 2.98 and analyzed at 97.5% n.v. with 89.3% conversion. The polymer was diluted to 75% solids with Cellosolve acetate (Union Carbide). 133 parts of this solution was blended with 92.9 parts of $TiO_2$, 12.5 parts of Cellosolve acetate, 25 parts of butyl alcohol, 40 parts of Cymel 303 (American Cyanamide), 1.4 parts of Paint Additive #14 (Dow Corning) and 1.4 parts of para-toluene sulfonic acid catalyst, Cycat 4040, (American Cyanamide Co.). The resulting formulation viscosity was 176 cps., which was well within desired application viscosity at 76.3% solids. The formulation was drawn down on a steel panel and baked at 135° C. for 20 minutes. The coating had very good gloss, a pencil hardness of H and was unaffected by over 200 rubs with methyl ethyl ketone. After 16 hours of mustard contact, the coating shows only moderate staining.

Previously, higher acrylates coatings, such as butyl acrylate-containing cross-linked appliance coatings, prepared from conventional acrylic polymers from known synthesis processes, were readily attacked by staining agents. Lower ($C_1$–$C_3$) acrylates were known to be subject to marring. The conventional polyester thermoset appliance coatings exhibited orange peel on application and did not yield smooth, glossy finishes. The present process provides resins which can be formulated into harder, smooth, glossy, stain resistant and mar-resistant appliance coatings.

EXAMPLE X

A thermoset clear overprint varnishes was prepared using a polymer prepared by reacting 26 parts styrene, 39 parts butyl acrylate and 35 parts hydroxyethyl methacrylate according to Example I, employing a mole ratio of di-tertbutyl peroxide initiator to monomers of 0.02:1, a reaction temperature of 260° C. and a 10 minute residence time. The polymer had a Mn of 1000, (W/N) of 1.62, (Z/N) of 2.71, a non-volatiles content of 95% and was 90.5% converted.

The polymer was made into a varnish according to the following formula: 53.7 parts of the polymer (at 95% solids) was blended with 44 parts of Beetle 64, a urea-formaldehyde cross-linking resin, (American Cyanamide Co.), 28.6 parts of isopropyl alcohol, and 4 parts of Cycat 296-9 catalyst (American Cyanamide Co.). This (75% solids) coating had a viscosity of 140 cps. at 70° F. The coating was drawn down on a printed paper-board substrate and baked at 125° C. for 20 seconds. The coating had good gloss, good scratch resistance and a slip angle of about 45°. The coating failed only when the substrate failed on bending. A two-minute spot test with methyl ethyl ketone did not affect the coating.

EXAMPLE XI

A detergent resistant, zinc cross-linked floor finish coating is made employing a polymer of Example VI (which had an acid number of 250 and is prepared employing the 60 minute residence time) in accordance with the following composition:

| Composition | Parts |
| --- | --- |
| (1) An emulsion polymer containing butyl acrylate 28%/methyl methacrylate 52%/styrene 12%/ methacrylic acid 8% (15% solids) and-2%/zinc as Zn $(NH_3)(HCO_3)_2$ on solids added. | 75 |
| (2) An ammonia-water cut of the resin of Example VI (31S/37AMS/32AA) (15% solids). | 10 |
| (3) Wax emulsion (15% solids) of an unoxidized low density polyethylene emulsion (supplied by Cosden Oil and Chemical Co.) | 15 |
| (4) Diethylene glycol monomethyl ether | 4 |
| (5) Tris-(butoxyethyl) phosphate | 1 |
| (6) Surfactant (1%) | 0.6 |
| (7) Defoaming agent | 0.0125 |

Components 1, 2 and 3 are mixed and stirred for 15 minutes. Components 4, 5, 6 and 7 are then added and the mixture adjusted to pH 9.0 with ammonium hydroxide.

Upon application to a floor the composition shows good leveling, gloss and recoatability.

EXAMPLE XII

A water based ink dispersant was prepared as follows:

An ammonium hydroxide resin cut was made from the resin prepared according to Example VI (31S/37AMS/32AA) (having a 15 minute residence time) according to the following formula:

| (A) | 31S/37AMS/32AA Resin | 34.00 parts |
| --- | --- | --- |
| | ammonium hydroxide (28%) | 7.30 parts |
| | propylene glycol | 1.46 parts |
| | isopropanol | 5.65 parts |
| | deionized water | 51.59 parts |
| | | 100.00 parts |

The above formula was heated with good agitation at 80° C. until all the resin was cut into solution. The resulting solution pH was 7.5 and the formulation exhibited a viscosity of 2700 cps. The pH was adjusted to 8.1 to reduce the viscosity to 330 cps at 34% solids.

A $TiO_2$ pigment was dispersed in the resin cut (A) according to the following formula:

| (B) | resin cut from (A) | 15.0 parts |
| --- | --- | --- |
| | $TiO_2$ | 25.0 parts |
| | ethanol | 5.0 parts |
| | deionized water | 5.0 parts |

The pigment was dispersed under shear into a uniform vehicle at 67% solids. The pigment dispersion from (B) was let down with a high molecular weight (200,000 Mw) emulsion polymer, Joncryl 74F (Johnson Wax), with a 49% solids level, according to the following formula:

| (C) | pigment grinding vehicle (B) | 60 parts |
| --- | --- | --- |
| | Joncryl 74F | 35 parts |
| | deionized water | 5 parts |

The resulting ink vehicle was 57.4% solids with a 19.9 seconds viscosity in a #2 Zahn cup. The viscosity after 3 days was 20.3 seconds. This vehicle was drawn down on a sealed gloss card and was allowed to dry overnight at room temperature. The 60° gloss was 59. The ink vehicle showed good self-sensitivity.

EXAMPLE XIII

A water-based clear overprint varnish was prepared as follows:

An ammonium hydroxide resin cut was made from the resin prepared according to Example VI (15 minute residence time) according to the following formula:

| (A) | 37S/37AMS/32AA Resin | 34.00 parts |
|---|---|---|
| | ammonium hydroxide (28%) | 7.30 parts |
| | propylene glycol | 1.46 parts |
| | isopropanol | 5.65 parts |
| | deionized water | 51.59 parts |
| | | 100.00 parts |

The above formula was heated with good agitation at 80° C. until all the resin was solubilized. The resulting viscosity was 330 cps. at a pH 8.1 and 34% solids.

A clear overprint varnish was made using a blend of the resin cut from (A), a high molecular weight (200,000 Mw) emulsion polymer (Joncryl 77 from Johnson Wax) and a slip aid wax emulsion (Jonwax 26 from Johnson Wax) according to the following formula:

| (B) | resin cut (A) (34% solids) | 25.0 parts |
|---|---|---|
| | Joncryl 77 (43% solids) | 59.0 parts |
| | Jonwax 26 (25% solids) | 10.0 parts |
| | zinc oxide | 5.9 parts |
| | antifoam | 0.2 parts |
| | | 100.1 parts |

The blend of components in (B) had a pH of 9.3 with a viscosity of 245 cps. This formula was drawn down on a printed card using a #18 RDS rod and allowed to dry at room temperature. The resulting coating had excellent gloss and clarity. The adhesion to card was excellent and showed good flexibility. This scratch resistant coating is useful for most printed substrates.

Although the invention has been described in detail by referring to certain preferred embodiments, it will be understood that various modifications can be made within the spirit and scope of the invention. The invention is not to be limited except as set forth in the following claims.

We claim:

1. Bulk polymerization process for preparing enhanced yields of high solids, low molecular weight vinylic polymer product having a narrow molecular weight distribution and a low chromophore content comprising the steps of continuously:
   (a) charging into a continuous mixed reactor zone containing a molten resin mixture;
      (i) a mixture of vinyl monomers comprising at least one monoalkenyl aromatic monomer and at least one acrylic monomer;
      (ii) a polymerization initiator in amounts to provide a molar ratio of said initiator to said mixture of vinyl monomers from about 0.0005:1 to 0.04:1;
      (iii) from about 0 to 25 percent based on the weight of vinyl monomers of a reaction solvent, wherein said molten resin mixture comprises unreacted vinylic monomers and the vinylic polymer product;
   (b) maintaining a flow rate through said reaction zone sufficient to:
      (i) provide a residence time of said charged vinylic monomer mixture in said reaction zone of from about two minutes to one hour; and
      (ii) maintain a predetermined level of reaction mixture in said reaction zone, and;
   (c) maintaining the molten resin mixture at a reaction temperature within the range from about 180° C. to 270° C. sufficient to provide accelerated conversion to a readily processable, uniform, concentrated polymer product having a number average molecular weight of 500 to 6000, a polydispersity ratio of less than about 2.5 and a dispersion index of less than about 4.5

2. The process of claim 1 including the step of separating the polymer product from unreacted monomers and by products of the reaction.

3. The process of claim 1 in which the initiator has a half-life of about 10 hours at 100° C.

4. The process of claim 3 in which the initiator is a peroxide or hydroperoxide.

5. The process of claim 1 in which the initiator is employed in a mole ratio from about 0.005:1 to 0.015:1.

6. The process of claim 1 in which the solvent is selected from a higher boiling (i) aromatic alcohol, (ii) an alcohol or glycol ether, ester, mixed ether and mixed ester, and (iii) a glyme or diglyme.

7. The process of claim 1 in which the reaction temperature is maintained in the range from about 215° C. to 270° C.

8. The process of claim 1 in which the reaction temperature is maintained in the range from about 180° C. to 215° C. and sufficient reaction solvent and initiator are employed to provide a polymer product having a number average molecular weight from about 1000 to 3000, a polydispersity ratio of less than about 2 and a dispersion index of up to about 3.3

9. The process of claim 1 in which the residence time is from about 2 to 20 minutes.

10. The process of claim 1 in which the acrylic monomer includes an acrylic carboxylic acid-containing monomer and, optionally, a non-carboxylic acid containing acrylic monomer to provide an alkali-soluble resin after reaction.

11. The process of claim 10 in which the carboxylic acid containing monomer is selected from acrylic acid and methacrylic acid.

12. The process of claim 10 in which the charge is from about 60 to 80% by weight of monoalkenyl aromatic monomer, from about 20 to 40% by weight of a carboxylic acid-containing acrylic monomer and from about 0 to 20% by weight of non-carboxylic acrylic monomer.

13. The process of claim 12 in which the monomer charge is 31 parts styrene, 37 parts alpha-methyl styrene, and 32 parts acrylic acid.

14. The process of claim 1 in which the monomers charge is adapted to form a cross-linkable thermoset polymer which comprises from about 10 to 80% by weight of a monoalkenyl aromatic monomer, from about 10 to 50% by weight of an alkyl ester of acrylic or methacrylic acid and from about 20 to 50% by weight of an hydroxy alkyl acrylate or hydroxy alkyl methacrylate.

15. The process of claim 14 in which the monomers charge is from about 20 to 50% by weight of monoalkenyl aromatic monomer, from about 10 to 40% by weight of said alkyl ester of acrylic or methacrylic acid and from about 20 to 50% by weight of said hydroxy alkyl acrylate or methacrylate.

16. The process of claim 14 in which said monomers charge is 40 parts styrene, 25 parts methyl methacrylate and 35 parts hydroxy ethylmethacrylate.

17. The process of claim 14 in which the monomers charge is 37 parts styrene, 38 parts 2-ethylhexylacrylate and 25 parts hydroxyethylmethacrylate.

18. The process of claim 1 in which the monomers charge comprises a monoalkenyl aromatic monomer and a an alkyl acrylate or a $C_4$ or higher methacrylate.

* * * * *

UNITED STATES PATENT AND TRADEMARK OFFICE
CERTIFICATE OF CORRECTION

PATENT NO. : 4,529,787

DATED : July 16, 1985

INVENTOR(S) : RONALD E. SCHMIDT, ET AL.

It is certified that error appears in the above-identified patent and that said Letters Patent is hereby corrected as shown below:

Col. 24, line 12, in claim 1, "dispersion" should be --distribution--.

Col. 24, lines 36, in claim 8, "dispersion" should be --distribution--.

Signed and Sealed this
Seventeenth Day of November, 1987

Attest:

DONALD J. QUIGG

*Attesting Officer*     *Commissioner of Patents and Trademarks*

REEXAMINATION CERTIFICATE (719th)

United States Patent [19]

Schmidt et al.

[11] B1 4,529,787

[45] Certificate Issued  Jul. 7, 1987

[54] BULK POLYMERIZATION PROCESS FOR PREPARING HIGH SOLIDS AND UNIFORM COPOLYMERS

[75] Inventors: Ronald E. Schmidt; Harold H. Schultz; Dennis M. Wilson, all of Racine, Wis.

[73] Assignee: S. C. Johnson & Son, Inc., Racine, Wis.

Reexamination Request:
No. 90/001,000, Apr. 26, 1986

Reexamination Certificate for:
Patent No.: 4,529,787
Issued: Jul. 16, 1985
Appl. No.: 388,764
Filed: Jun. 15, 1982

[51] Int. Cl.$^4$ ............................................. C08F 2/02

[52] U.S. Cl. .................................. 526/209; 526/212; 526/213; 526/227; 526/230; 526/318.6; 526/320; 526/329.2

[58] Field of Search ......................................... 526/209

[56] References Cited

FOREIGN PATENT DOCUMENTS

| | | |
|---|---|---|
| 2421826 | 11/1975 | Fed. Rep. of Germany . |
| 2502172 | 7/1976 | Fed. Rep. of Germany . |
| 2548393 | 5/1977 | Fed. Rep. of Germany . |
| 3026831 | 2/1982 | Fed. Rep. of Germany . |
| 0047889 | 3/1982 | Fed. Rep. of Germany . |

*Primary Examiner*—Paul R. Michl

[57] ABSTRACT

A process to continuously bulk polymerize vinylic monomers to prepare low molecular weight, uniform, polymers employs minor amounts of initiator and, optionally solvents, at short residence times and moderate reaction temperatures to provide high yields of a product suitable for high solids applications.

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-18 is confirmed.

* * * * *